United States Patent
Cooley et al.

(10) Patent No.: US 9,795,189 B2
(45) Date of Patent: Oct. 24, 2017

(54) DRAWSTRING CLAMPING DEVICE

(71) Applicant: THINGZ, LLC, Titusville, FL (US)

(72) Inventors: Scott Cooley, Vero Beach, FL (US); Arthur Todd Parkhouse, Oneida, KY (US)

(73) Assignee: Thingz, LLC, Vero Beach, FL (US)

( * ) Notice: Subject to any disclaimer, the term of this patent is extended or adjusted under 35 U.S.C. 154(b) by 31 days.

(21) Appl. No.: 14/826,789

(22) Filed: Aug. 14, 2015

(65) Prior Publication Data

US 2016/0047403 A1    Feb. 18, 2016

Related U.S. Application Data

(60) Provisional application No. 62/070,034, filed on Aug. 14, 2014.

(51) Int. Cl.
  *F16B 2/12* (2006.01)
  *A43C 9/00* (2006.01)
  *A43C 11/24* (2006.01)
  *F16G 11/06* (2006.01)
  *A43C 7/00* (2006.01)
  *A43C 1/06* (2006.01)

(52) U.S. Cl.
  CPC ............... *A43C 11/24* (2013.01); *A43C 1/06* (2013.01); *A43C 7/00* (2013.01); *F16G 11/06* (2013.01); *Y10T 24/3705* (2015.01); *Y10T 24/3967* (2015.01)

(58) Field of Classification Search
  CPC .. A43C 11/24; A43C 1/06; A43C 7/00; Y10T 24/3705; Y10T 24/3713; Y10T 24/3718; Y10T 24/3703; Y10T 24/3967; F16G 11/06
  See application file for complete search history.

(56) References Cited

U.S. PATENT DOCUMENTS

| | | | |
|---|---|---|---|
| 155,156 A | 9/1874 | Heney | |
| 660,643 A | 10/1900 | Kroeninger | |
| 670,561 A | 3/1901 | Hoegemann | |
| 790,315 A | 5/1905 | Rodney | |
| 819,884 A | 5/1906 | Higgins | |
| 864,172 A | 8/1907 | Knapp | |
| 948,460 A | 2/1910 | Partridge | |
| 2,130,825 A * | 9/1938 | Bergan | H01R 4/22 174/87 |
| 2,137,834 A * | 11/1938 | Dibner | H01R 4/32 403/399 |
| 2,612,135 A | 9/1952 | Iny | |
| 3,070,863 A | 1/1963 | Eberwein | |
| 3,122,805 A | 3/1964 | Hakim | |

(Continued)

*Primary Examiner* — Robert J Sandy
(74) *Attorney, Agent, or Firm* — Kelly G. Swartz; Widerman Malek, PL (57) ABSTRACT

An drawstring clamping device having a first member and a second member. The first member has a first member base, a first tower structure secured to the first member base at a first tower structure first end, and a second tower structure secured to the first member base at a second tower structure first end. The second member has a second member base with an aperture disposed therethrough. The aperture is configured to adjustably engage the first tower structure and the second tower structure.

16 Claims, 4 Drawing Sheets

(56) References Cited

U.S. PATENT DOCUMENTS

| | | | |
|---|---|---|---|
| 4,244,083 A * | 1/1981 | Aremka | F16L 3/10 |
| | | | 24/16 R |
| 4,514,882 A | 5/1985 | Lavielle | |
| 4,715,094 A | 12/1987 | Herdman | |
| 4,852,223 A | 8/1989 | McCreary | |
| 5,022,127 A | 6/1991 | Ang | |
| 5,372,510 A | 12/1994 | Stanfield | |
| 5,649,342 A | 7/1997 | D'Andrade et al. | |
| 5,722,132 A | 3/1998 | Jones | |
| 5,903,959 A * | 5/1999 | Leonardi | A43C 7/08 |
| | | | 24/115 G |
| 6,044,527 A | 4/2000 | Ishida et al. | |
| 6,470,542 B1 | 10/2002 | Giannini | |
| 6,675,446 B2 | 1/2004 | Buettell | |
| 8,181,320 B2 | 5/2012 | Wolfberg | |
| 8,671,526 B2 | 3/2014 | Jeter | |
| 8,782,860 B2 | 7/2014 | Rogers | |
| 9,044,068 B2 | 6/2015 | Neale | |
| 2003/0121126 A1 | 7/2003 | Buscart | |
| 2004/0148742 A1 | 8/2004 | Berns | |
| 2007/0256281 A1 | 11/2007 | Breuer | |
| 2009/0064473 A1 | 3/2009 | Chan | |
| 2010/0154182 A1 | 6/2010 | Lindow | |
| 2011/0277282 A1 | 11/2011 | Matrejek | |
| 2013/0269219 A1 | 10/2013 | Burns et al. | |
| 2014/0000074 A1 | 1/2014 | Guthner | |
| 2014/0325806 A1 | 11/2014 | Foley et al. | |
| 2015/0007423 A1 | 1/2015 | Yang | |
| 2015/0040360 A1 | 2/2015 | Manganaro et al. | |
| 2015/0059136 A1 | 3/2015 | Schreiner | |
| 2015/0096158 A1 | 4/2015 | Shattuck | |

* cited by examiner

FIG. 8

DRAWSTRING CLAMPING DEVICE

RELATED APPLICATIONS

This application claims the benefit under 35 U.S.C. §119 (e) of U.S. Provisional Patent Application Ser. No. 62/070,034 filed on Aug. 14, 2014 and titled String-Thingz-2.0, the entire content of which is incorporated herein by reference

FIELD OF THE INVENTION

The present invention relates to apparatuses attached to stringed items or items that use strings or cords for functional or decorative purposes, for example, clothing such as sweatpants, shorts, hoods, jackets, or non-clothing items such as backpacks, luggage, tote bags, laundry bags or other apparatuses that have exposed strings or cords. The apparatus prevents the string from being lost or receded into the garment or carrying item while simultaneously displaying a logo, emblem or desired design and adjusting the effective length of the string.

BACKGROUND

Drawstrings and cords are used extensively on various items such as, for example, articles of clothing, sporting goods, back packs and other apparatuses that have strings or cords for functional, fashion, or decorative purposes. For example, hoods on jackets, sweatshirts and other garments commonly are provided with drawstrings or cords, allowing the hood to be cinched around the face or neck of the wearer. Clothing such as sweat pants, regular pants, shorts, swim trunks, and the like commonly use drawstrings incorporated into a garment's waist band, allowing the garment to be drawn around a wearer's waist. On luggage, backpacks and other gear, drawstrings and cords are used to fasten pockets and other openings.

With continued use, drawstrings and cords tend to shift so that one or both ends of the string will retract into a garment or carrying item, thus being unavailable for the user to implement when needed. Often users will try to tie a knot in the string to prevent string loss, but such knots can be small and do not prevent the string from receding into a garment or carrying item. Also, knotted strings or strings by themselves do not provide adequate surface area to display decorative team logos or company emblems on the string or cord.

To overcome the difficulties associated with drawstrings receding into a clothing garment or retracting into a piece of luggage, backpack, or sportspack, prior art devices such as cord locks or lace locks have been devised. Masuda et al (U.S. Pat. No. 5,323,514) discloses a cord stopper with multiple rigid plastic interlocking parts including an insert member and a cylindrical housing. The device further comprises rigid coil springs, a circular head, a circular bottom lid, and a circular platform, all of which add to the complexity of the device. In order to secure a string or cord within this device, the user must firmly squeeze and hold the cord stopper, and thread the string through, release the grip, which binds the cord thereto. While this device is able to fasten to the string, the strong springs and hard plastic can sometimes work to clinch down and damage a soft drawstring or cord. Since the cord stopper and similar devices are spring loaded, the devices work only until the string softens or hardens through multiple use, or until the spring falls out. If they come off the string, most designs fall apart because the string lets go, or one of the pieces comes off, rendering the device unusable. Moreover, the multiple parts needed to construct this device add to the manufacturing cost and manufacturing time. Lastly, the small cylindrical surface area of the cord stopper does not allow a user or maker of the device to adequately display a team or company logo or emblem on one flat surface.

Several devices have been patented which aim to secure the laces for athletic shoes. Funk (U.S. Pat. No. 6,938,308 B2) discloses a lace securing and adjusting device including a body and apertures that are positioned laterally on opposite sides of a center aperture. Hicks et al (U.S. Pat. No. 5,979,028) discloses a shoe lace clip, with holes through which both shoelaces pass, and slots that extend into the middle of the clip, which are used to increase the holding pressure on the lace ends. While these devices are designed to thread both laces through the middle and end apertures and slots in elaborate patterns which enable the user to secure the devices in place so as to prevent the shoelaces from being undone, the surface area taken up by the multiple apertures, slots and the laces that cover the front of the apparatuses do not allow a maker of the device or user to adequately display a wide variety and sizes of team logos or company emblem as are known in the marketplace.

What is needed in the art is a string clamping apparatus of simple design comprising relatively few parts that can be attached to a string or cord to prevent the string from getting lost or shorten the effective length of the string, while also providing space to identify the source or labeling to the user or the owner of the apparatus.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention advantageously provides a drawstring clamping device for use by with items having drawstrings, cords, strings, or the like. The present invention also advantageously provides a clamping system that is cost efficient. The present invention further advantageously provides a device that prevents drawstrings from retreating into the article to which the drawstring is attached. The present invention still further advantageously provides a surface to which ornamentation may be affixed.

These and other objects, features and advantages of the present invention are provide by a drawstring clamping device that has a first member and a second member. The first member has a first member base, a first tower structure secured to the first member base, and a second tower structure secured to the first member base. The second member has a second member base with an aperture disposed therethrough. The aperture is configured to adjustably engage the first tower structure and the second tower structure.

The first member may have a first plurality of ridges disposed on a first tower structure outer side and a second plurality of ridges disposed on a second tower structure outer side.

The second member may have a groove disposed on a perimeter of the aperture, wherein the groove is configured to engage at least one of the first plurality of ridges and at least one of the second plurality of ridges.

The first tower structure first end and the second tower structure first end may extend through the aperture.

A first tower structure first end may be disposed in a first vertical alignment with a first tower structure second end. The first tower structure first end may be configured to be disposed toward a center of the aperture and in a first vertical misalignment with the first tower structure second end. The first vertical misalignment of the first tower structure first end with the first tower structure second end may disengage all of the at least one of the first plurality of ridges from the groove.

A second tower structure first end may be disposed in a second vertical alignment with a second tower structure second end. The second tower structure first end may be configured to be disposed toward the center of the aperture and in a second vertical misalignment with the second tower structure second end. The second vertical misalignment of the second tower structure first end with the second tower structure second end may disengage all of the at least one of the second plurality of ridges from the groove. The first vertical misalignment of the first tower structure first end with the first tower structure second end and the second vertical misalignment of the second tower structure first end with the second tower structure second end may disengage the first member from the second member.

The first member may have a first tower structure first ridge disposed on a first tower structure outer side and a first tower structure second ridge disposed on the first tower structure outer side along with a second tower structure first ridge disposed on a second tower structure outer side in a first horizontal alignment with the first tower structure first ridge and a second tower structure second ridge disposed on the second tower structure outer side in a second horizontal alignment with the first tower structure second ridge. The second member may have a groove disposed on a perimeter of the aperture, wherein the groove may be configured to simultaneously engage the first tower structure first ridge and the second tower structure first ridge or the first tower structure second ridge and the second tower structure second ridge.

A first indicia may be disposed on a first member base bottom side.

The first member may have a first member first drawstring capture upright, having a first member first arcuate depression formed on a first member first drawstring capture upright upper side thereof, disposed on the first member base. The second member may have a second member first drawstring capture upright, having a second member first arcuate depression formed on a second member first drawstring capture upright upper side thereof, disposed on the second member base. The first member first arcuate depression may oppose the second member first arcuate depression.

A first member first drawstring capture upright first rib may be disposed within the first member first arcuate depression along a first member first drawstring capture upright inner edge. A first member first drawstring capture upright second rib may be disposed within the first member first arcuate depression along a first member first drawstring capture upright outer edge, parallel to the first member first drawstring capture upright first rib. A second member first drawstring capture upright first rib may be disposed within the second member first arcuate depression along a second member first drawstring capture upright inner edge. A second member first drawstring capture upright second rib may be disposed within the second member first arcuate depression along a second member first drawstring capture upright outer edge, parallel to the second member first drawstring capture upright first rib.

The first member may have a first member second drawstring capture upright, having a first member second arcuate depression formed on a first member second drawstring capture upright upper side thereof, disposed on the first member base parallel to the first member first drawstring capture upright. The second member may have a second member second drawstring capture upright having a second member second arcuate depression formed on a second member second drawstring capture upright upper side thereof, disposed on the second member base parallel to the second member first drawstring capture upright. The first member second arcuate depression may oppose the second member second arcuate depression.

The first tower structure may be disposed on the first member base between the first member first drawstring capture upright and the first member second drawstring capture upright. The second tower structure may be disposed on the first member base opposing the first tower structure and between the first member first drawstring capture upright and the first member second drawstring capture upright.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a drawstring clamping device 30 that is formed from two pieces, a first member 31 and a second member 32. The two members 31 and 32 secure to one another and capture a drawstring, cord, string, or the like between the members.

Figure 1:
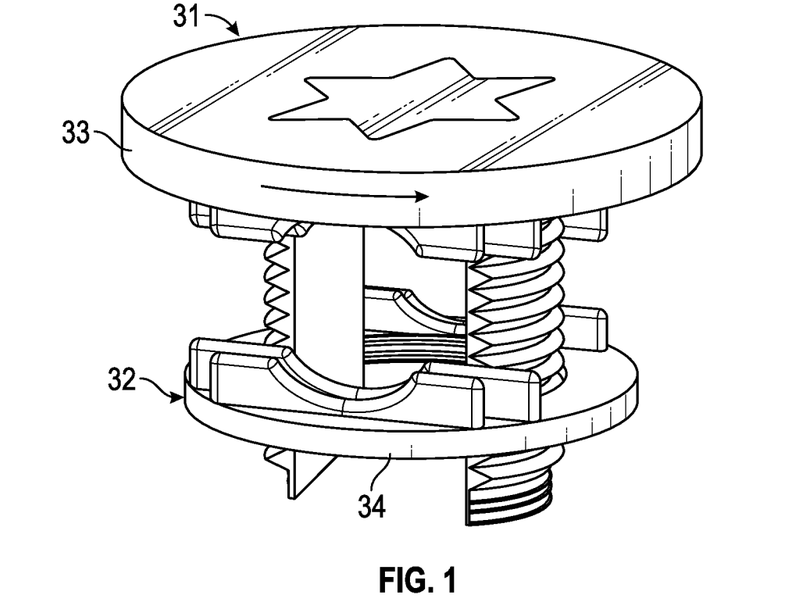
FIG. 1 is a side perspective view of a drawstring clamping device according to an embodiment of the present invention.
Figure 2:
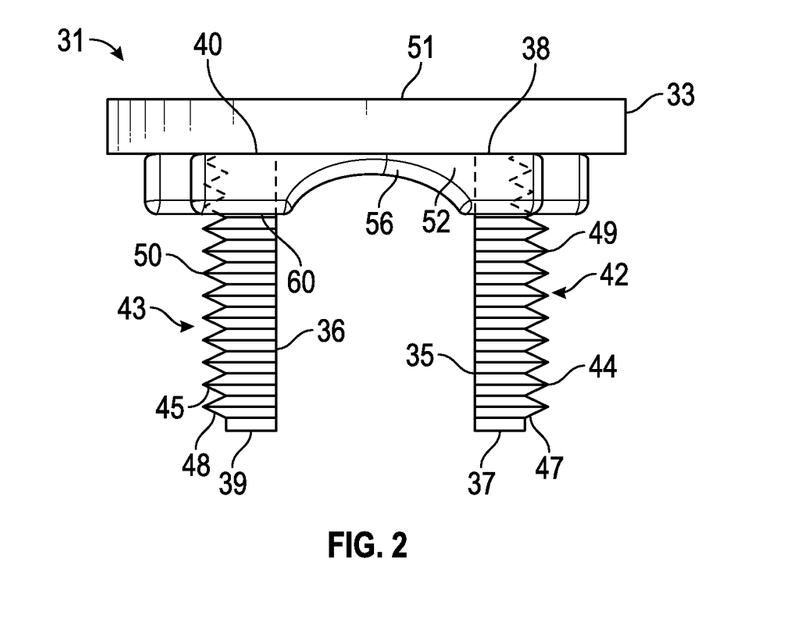
FIG. 2 is a side view of the first member of the drawstring clamping device of FIG. 1.
Figure 8:
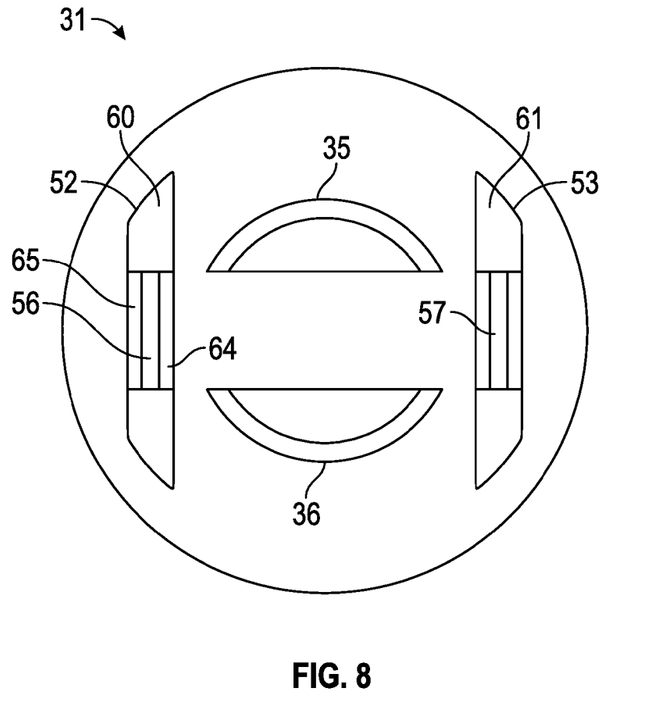
FIG. 8 is a bottom view of the first member of the drawstring clamping device of FIG. 1.

The first member 31 may have a first member base 33 and two tower structures 35 and 36. The first member base 33 may be any shape. By way of example, and not as a limitation, the first member base may be circular, angular, triangular, ovoid, elliptical, or the like. Again, by way of example, and not as a limitation, the first member base 33 may be decoratively shaped to resemble a cartoon character, sports mascot, flower, vehicle, decorative object, or the like. The first member base 33 may have a first member base bottom side 51 opposing a first member base top side. The first tower structure 35 and the tower structure 36 may be secured to the first member base top side. A first indicia 68 may be disposed on the first member base bottom side 51. The first indicia 68 may be disposed on to the surface of the first member base bottom side 51. The first indicia 68 may be formed into the surface of the first member base bottom side 51.

Figure 7:
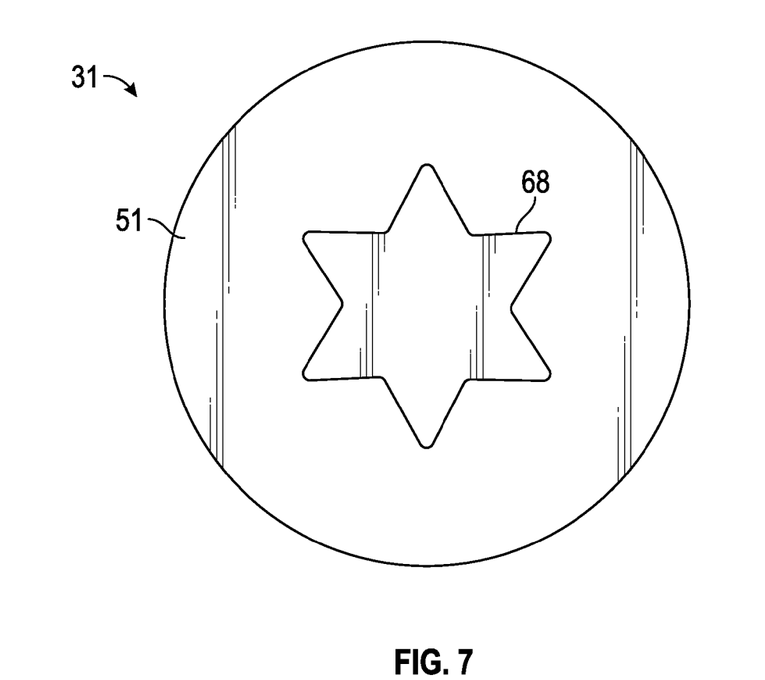
FIG. 7 is a top view of the first member of the drawstring clamping device of FIG. 1.

The first tower structure 35 may have a first tower structure first end 37 and a first tower structure second end 38. The second tower structure 36 may have a second tower structure first end 39 and a second tower structure second end 40. The first tower structure second end 38 and the second tower structure second end 40 may be secured to the first member base 33. The first structure first end 37 and the second tower structure first end 39 may extend perpendicularly from the first member base 33. The first tower structure 35 and the second tower structure 36 may oppose one another. Each tower structure 35, 36 may have a flat side and a rounded side. The rounded side of the first tower structure 35 may be disposed toward the perimeter of the first member base 33 and may be called the first tower structure outer side 44. The rounded side of the second tower structure 36 may be disposed toward the perimeter of the first member base 33 and may be called the second tower structure outer side 45. The flat side of each tower structure 35, 36 may be disposed toward the center of the first member base 33. The flat side of the first tower structure 35 may be the first tower structure inner side. The flat side of the second tower structure 36 may be the second tower structure inner side. The inner side of the first tower structure 35 may be parallel to and oppose the inner side of the second tower structure 36. The first tower structure outer side 44 may face away from the second tower structure 36. Likewise, the second tower structure outer side 45 may face away from the first tower structure 35.

The first tower structure 35 may be located sufficient distance from the second tower structure 36 to allow a cord, drawstring, string, or the like to pass between the first tower structure 35 and the second tower structure 36. These tower structures 35 and 36 may interface with the second member 32 to secure the two members 31 and 32 together and secure the cord, drawstring, string, or the like between the two members 31, 32.

The second member 32 may have a second member base 34 with an aperture 41 disposed through the second member base 34. The second member base 34 may be any shape. By way of example, and not as a limitation, the second member base 34 may be circular, angular, triangular, ovoid, elliptical, or the like. Again, by way of example, and not as a limitation, the second member base 34 may be decoratively shaped to resemble a cartoon character, sports mascot, flower, vehicle, decorative object, or the like. The second member base 34 may have a second member base bottom side opposing a second member base top side. A second indicia may be disposed on the second member base bottom side. The second indicia may be disposed on to the surface of the second member base bottom side. The second indicia may be formed into the surface of the second member base bottom side.

Figure 4:
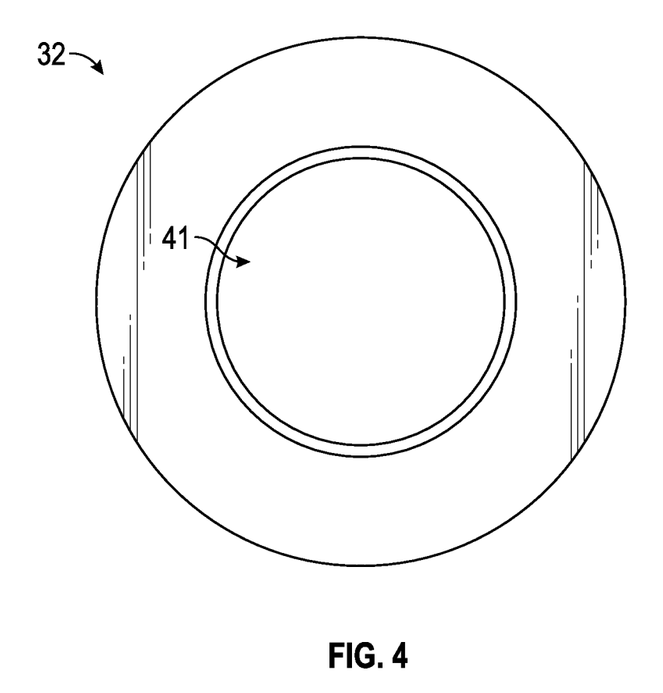
FIG. 4 is a top view of a second member of the drawstring clamping device of FIG. 1.
Figure 5:
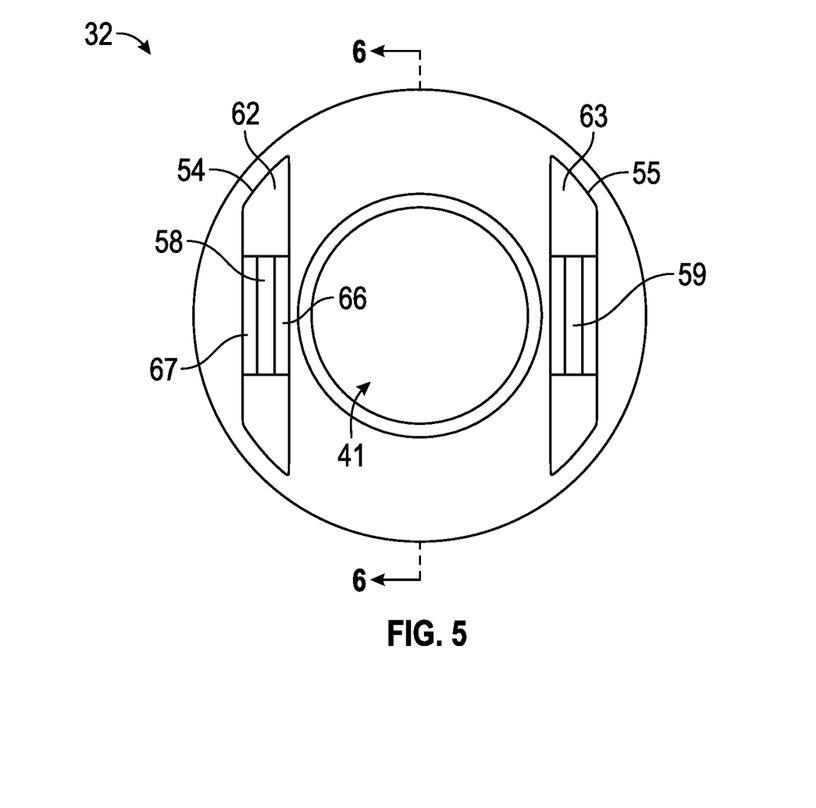
FIG. 5 is a bottom view of the second member of the drawstring clamping device of FIG. 1.

The aperture 41 may be any shape, including, by way of example, and not as a limitation, round, square, ovoid, polygonal, or the like. Again, by way of example, and not as a limitation, the aperture 41 may be decoratively shaped to resemble a cartoon character, sports mascot, flower, vehicle, decorative object, or the like. The aperture 41 may be sized to allow both the first tower structure 35 and the second tower structure 36 to pass through the aperture. The aperture 41 may be sized to allow both the first tower structure 35 and the second tower structure 36 to be disposed away from the perimeter of the aperture 41 simultaneously. The aperture may be configured to adjustably engage the first tower structure 35 and the second tower structure 36. The aperture 41 may have an engaging structure disposed on its inner perimeter to engage and secure the first tower structure 35 and the second tower structure 36. This engagement may be adjustable, which means that the aperture may alternately engage the first tower structure 35 and the second tower structure 36 at at least two different locations, each of which may create a different opening height between the first member 31 and second member 32.

Engaging the first member 32 at the first engagement location may create a first opening height between the first member base 33 and the second member base 34. Engaging the first member 32 at the second engagement location may create a second opening height between the first member base 33 and the second member base 34. The second engagement height may be different from the first engagement height.

The first member 31 and the second member 32 may be alternately secured to one another at either the first engagement location or the second engagement location. Multiple engagement locations may be located along the first tower structure 35 and the second tower structure 36 and may be evenly spaced from one another. The first tower structure 35 and the second tower structure 36 may have the same number of engagement locations. Engagement locations on the first tower structure 35 may horizontally align with engagement locations on the second tower structure 36. The engagement locations may be disposed on the first tower structure outer side 44 and the second tower structure outer side 45.

An engagement location on the first tower structure outer side 44 may be shaped to conform to the perimeter of the aperture 41. An engagement location on the second tower structure outer side 45 may be shaped to conform to the perimeter of the aperture 41.

A first plurality of ridges 42 may be disposed on the first tower structure outer side 44. A second plurality of ridges 43 may be disposed on the second tower structure outer side 45. Each of the first and second plurality of ridges 42, 43 may be configured to secure to the perimeter of the aperture 41. One of the ridges of the first plurality of ridges 42 may be a first tower structure first ridge 47. One of the ridges of the second plurality of ridges 43 may be a second tower structure first ridge 49. The first tower structure first ridge 47 may be disposed on the first tower structure outer side 44 in a first horizontal alignment with the second tower structure first ridge 49 that is disposed on the second tower structure outer side 45. The first tower structure first ridge 47 may be in horizontal alignment with the second tower structure first ridge 49 when the first tower structure first ridge 47 is aligned with the second tower structure first ridge 49 along a line essentially parallel to the face of the first member base 33. A line is essentially parallel to the face of the first member base 33 when the line forms less than a 10° angle with respect to the face of the first member base 33. A second of the ridges of the first plurality of ridges 42 may be a first tower structure second ridge 48. A second of the ridges of the second plurality of ridges 43 may be a second tower structure second ridge 50. The first tower structure second ridge 48 may be disposed on the first tower structure outer side 44 in a second horizontal alignment with the second tower structure second ridge 50 that is disposed on the second tower structure outer side 45.

Each ridge of the first plurality of ridges 42 may have a corresponding horizontally aligned ridge in the second plurality of ridges 43. Corresponding ridges in the first plurality of ridges 42 and the second plurality of ridges 43 may be disposed on the first tower structure 35 and the second tower structure 36 equal vertical distances from the first member base 33. Corresponding ridges may be engaged by the second member 32. The opening height between the first member base 33 and the second member base 34 may be adjusted by engaging different sets of corresponding ridges by the second member 32.

Figure 6:
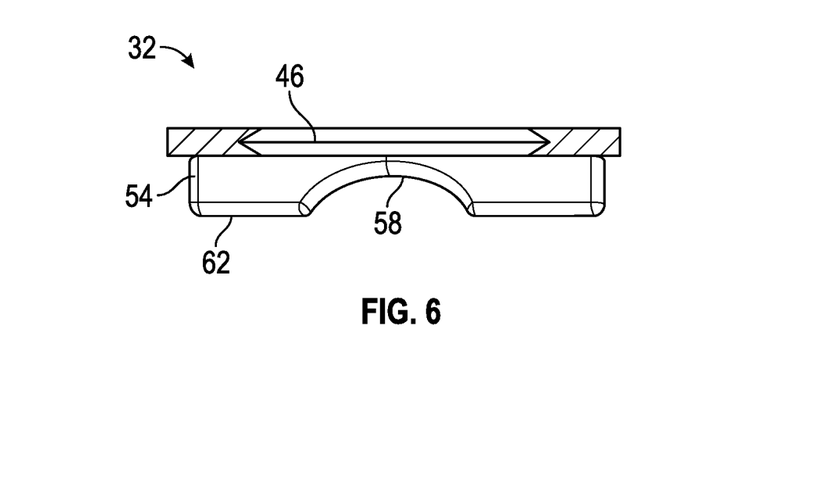
FIG. 6 is a cross section view of the second member taken through the 6-6 line in FIG. 5.

A groove 46 may be disposed on the perimeter of the aperture 41. The groove 46 may be configured to simultaneously engage corresponding ridges. The groove may simultaneously engage the first tower structure first ridge 47 and the second tower structure first ridge 49 or the groove may simultaneously engage the first tower's structure second ridge 48 and the second tower structure second ridge 50. The groove 46 may be configured to engage any corresponding set of ridges from the first plurality of ridges 42 and the second plurality of ridges 43. The groove 46 may be disposed continuously along the perimeter of the aperture 41. The groove 46 may be disposed only along a portion of the perimeter of the aperture 41. The groove 46 may be disposed along two opposing portions of the perimeter of the aperture 41.

The groove 46 may be shaped to receive and secure one of the first plurality of ridges 42 and one of the second plurality of ridges 43. By way of example, and not as a limitation, if the ridges are outwardly extending triangular components, the groove 46 may define an inwardly extending triangular void. Again, by way of example, and not as a limitation, if the ridges are outwardly extending rounded components, the groove may define an inwardly extending arcuate void.

To secure the first member 31 to the second member 32, portions of the first tower structure 35 and the second tower structure 36 may extend through the aperture 41. The first tower structure first end 37 may be the free end, which is not connected to the first member base 43. The second tower structure first end 39 may be the free end, which is not connected to the second member base 34. Both the first tower structure first end 37 and second tower structure first end 39 may extend through the aperture 41 when securing the first member 31 to the second member 32.

The first tower structure first end 37 may be in a first vertical alignment with the first tower structure second end 38 to secure the first tower structure 35 to the second member 32. Being in a first vertical alignment may mean that the first tower structure first end 37 is located in line with the first tower structure second end 38 along a line extending essentially 90° from a face of the first member base 33. Essentially 90° may be in the range from 80°-100° as measured from a face of the first member base 33.

The second tower structure first end 39 may be in a second vertical alignment with the second tower structure second end 40 to secure the second tower structure 36 to the second member 32. Being in a second vertical alignment may mean that the second tower structure first end 39 is located in line with the second tower structure second end 40 along a line extending essentially 90° from a face of the first member base 33.

The first tower structure first end 37 and the second tower structure first end 39 may be disposed toward one another to allow the first member 31 to be positioned to engage with the second member 32. Disposing the first tower structure first end 37 toward the center of the aperture 41 may create a first vertical misalignment between the first tower structure first end 37 and the first tower structure second end 38. Disposing the second tower structure first and 39 toward the center of the aperture 41 may create a second vertical misalignment between the second tower structure first end 39 and the second tower structure second end 40.

A first vertical misalignment between the first tower structure first end 37 and the first tower structure second end 38 may occur when the first tower structure first end 37 is disposed horizontally toward the center of the aperture 41 a first sufficient horizontal distance to disengage at least one of the first plurality of ridges 42 from the groove 46. A first vertical misalignment between the first tower structure first end 37 and the first tower structure second end 38 may occur when the first tower structure first end 37 is disposed horizontally toward the center of the aperture 41 a first sufficient horizontal distance to disengage all of the at least one of the first plurality of ridges 42 from the groove 46. A first sufficient horizontal distance may be the distance required to locate the first tower structure first end 37 in line with the first tower structure second end 38 along a line extending less than 80° from a face of the first member base 33.

A second vertical misalignment between the second tower structure first end 39 and the second tower structure second end 40 may occur when the second tower structure first end 39 is disposed horizontally toward the center of the aperture 41 a second sufficient horizontal distance to disengage at least one of the second plurality of ridges 43 from the groove 46. A second vertical misalignment between the second tower structure first end 39 and the second tower structure second end 40 may occur when the second tower structure first end 39 is disposed horizontally toward the center of the aperture 41 a second sufficient horizontal distance to disengage all of the at least one of the second plurality of ridges 43 from the groove 46. A second sufficient horizontal distance may be the distance required to locate the second tower structure first end 39 in line with the second tower structure second end 40 along the line extending less than 80° from a face of the first member base 33.

The first tower structure 35 and the second tower structure 36 may be simultaneously disengaged from the second member 32 to disengage the first member 31 from the second member 32. Simultaneous first vertical misalignment and second vertical misalignment may disengage the first member 31 from the second member 32

In one embodiment, the first tower structure first end 37 and the second tower structure first end 39 may be disposed toward one another in vertical misalignment to orient corresponding ridges of the first plurality of ridges 42 and the second plurality of ridges 43 within the groove 46. Subsequent vertical alignment of the first tower structure first end 37 with the first tower structure second end 38 and vertical alignment of the second tower structure first end 39 with the second tower structure second and 40 may engage at least one of the first plurality of ridges 42 and at least one of the second plurality of ridges 43 with the groove 46.

A drawstring capture upright may be disposed on both the first member 31 and the second member 32. In one embodiment, a pair of drawstring capture uprights may be disposed on both the first member 31 and the second number 32. Each drawstring capture upright may have a drawstring capture upright inner edge proximate to the center of the base on which it is disposed and a drawstring capture upright outer edge proximate to the perimeter of the base on which it is disposed. In embodiments with a pair of drawstring capture uprights disposed on a single base, the drawstring capture upright inner edges may be essentially parallel to one another. Inner edges may be essentially parallel to one another when lines parallel to each drawstring capture upright would not intersect or would intersect at an angle of less than 10°.

Each drawstring capture upright disposed on the first member 31 may oppose a corresponding drawstring capture upright disposed on the second member 32. Each drawstring capture upright may have a lower side that attaches to either the first member 31 or the second member 32. An upper side of the drawstring capture upright may oppose the lower side of the drawstring capture upright.

An arcuate depression may be formed along the upper side of each drawstring capture upright. The arcuate depression may define a portion of a circular void. Opposing drawstring capture uprights disposed on the first member 31 and the second member 32 may be configured to have opposing arcuate depressions that may capture a string, cord, drawstring, or the like between the drawstring capture uprights. The arcuate depression may be formed in the shape of at least a portion of the perimeter of a cross-section of the string, cord, drawstring, or the like. The arcuate depression may define a semicircular void disposed along the drawstring capture upright upper side. The arcuate depression may be centered along the length of drawstring capture upright and extend the width of the drawstring capture upright.

One or more ribs may be formed along each arcuate depression. In one embodiment, a rib may be formed along the inner edge or the outer edge of each drawstring capture upright. In one embodiment, a rib may be formed along the center of each drawstring capture upright. In another embodiment, a rib may be formed along the inner edge of a drawstring capture upright and an outer edge of an opposing drawstring capture upright. In yet another embodiment, a ridge may be formed along the inner edge and outer edge of a drawstring capture upright and along the center of an opposing drawstring capture upright. Multiple ribs disposed along a single drawstring capture upright may be parallel to one another.

A first member first drawstring capture upright 52 may be disposed on the first member base top side. A first member second drawstring capture upright 53 may also be disposed on the first member base top side. The first member first drawstring capture upright lower side and the first member second drawstring capture upright lower side may attach to the first member base top side. The first member first drawstring capture upright 52 may be parallel to the first member second drawstring capture upright 53. A first member first arcuate depression 56 may be formed on the first member first drawstring capture upright upper side 60. A first member second arcuate depression 57 may be formed on the first member second drawstring capture upright upper side 61.

Figure 3:
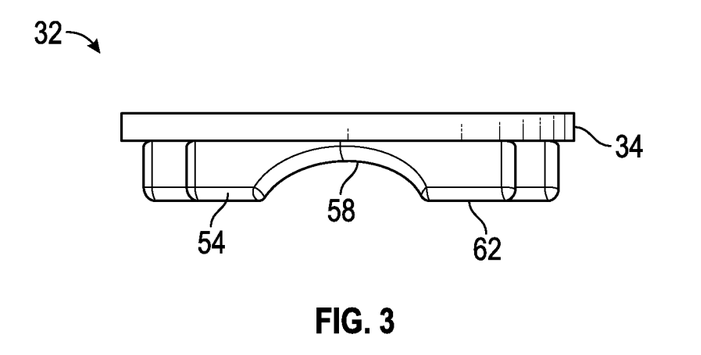
FIG. 3 is a side view of a second member of the drawstring clamping device of FIG. 1.

A second member first drawstring capture upright 54 may be disposed on the second member base top side. A second member second drawstring capture upright 55 may also be disposed on the member base top side. The second member first drawstring capture upright lower side and the second member second drawstring capture upright lower side may attach to the second member base top side. The second member first drawstring capture upright 54 may be parallel to the second member second drawstring capture upright 55. A second member first arcuate depression 58 may be formed on the second member first drawstring capture upright upper side 62. A second member second arcuate depression 59 may be formed on the second member second drawstring capture upright upper side 63.

The first member first arcuate depression 56 may oppose the second member first arcuate depression 58. The second member second arcuate depression 59 may oppose the first member second arcuate depression 57.

The first member first drawstring capture upright 52 may oppose the second member first drawstring capture upright 54. The first member first arcuate depression 56 may oppose the second member first arcuate depression 58. The first member second drawstring capture upright 53 may oppose the second member second drawstring capture upright 55. The first member second arcuate depression 57 may oppose the second member second arcuate depression 59.

A first member first drawstring capture upright first rib 64 may be disposed within the first member first arcuate depression 56 along the first member first drawstring capture upright inner edge. A first member first drawstring capture upright second rib 65 may be disposed within the first member first arcuate depression 56 along the first member first drawstring capture upright outer edge. The first member first drawstring capture upright first rib 64 may be parallel to the first member first drawstring capture uprights second rib 65.

A first member second drawstring capture upright first rib may be disposed within the first member second arcuate depression 57 along the first member second drawstring capture upright inner edge. A first member second drawstring capture upright second rib may be disposed within the first member second arcuate depression 57 along the first member second drawstring capture upright outer edge. The first member second drawstring capture upright first rib may be parallel to the first member second drawstring capture upright second rib.

A second member first drawstring capture upright first rib 66 may be disposed within the second member first arcuate depression 58 along the second member first drawstring capture upright inner edge. A second member first drawstring capture upright second rib 67 may be disposed within the second member first arcuate depression 58 along the second member first drawstring capture upright outer edge. The second member first drawstring capture upright first rib 66 may be parallel to the second member first drawstring capture upright second rib 57.

A second member second drawstring capture upright first rib may be disposed within the second member second arcuate depression 59 along the second member second drawstring capture upright inner edge. A second member second drawstring capture upright second rib may be disposed within the second member second arcuate depression 59 along the second member second drawstring capture upright outer edge. The second member second drawstring capture upright first rib may be parallel to the second member second drawstring capture upright second rib.

The first tower structure 35 and the second tower structure 36 may oppose one another and be centered on a midpoint of the first member base 33. The first member first drawstring capture upright 52 and the first member second drawstring capture upright 53 may be positioned on distal sides of the first tower structure 35 and the second tower structure 36. The first tower structure 35 may be disposed on the first member base 33 and centered between the first member first drawstring capture upright 52 and the first member second drawstring capture upright 53. The second tower structure 36 may be disposed on the first member base 33 aligned with and opposing the first tower structure 35. The second tower structure 36 may be centered between the first member first drawstring capture upright 52 and the first member second drawstring capture upright 53.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A drawstring clamping device comprising:
   a first member comprising:
      a first member base;
      a first tower structure secured to the first member base at a first tower structure first end, wherein the first tower structure comprises:
         a first tower structure outer side, and
         a first plurality of ridges disposed on the first tower structure outer side,
         a first tower structure second end disposed in a first vertical alignment with the first tower structure first end,
         wherein the first tower structure first end is configured to be disposed toward a center of the aperture and in a first vertical misalignment with the first tower structure second end, and
         wherein the first vertical misalignment of the first tower structure first end with the first tower structure second end disengages all of the at least one of the first plurality of ridges from the groove;
      a second tower structure secured to the first member base at a second tower structure first end, wherein the second tower structure further comprises:
         a second tower structure outer side, and
         a second plurality of ridges disposed on the second tower structure outer side; and
   a second member comprising:
      a second member base with an aperture disposed therethrough, wherein the aperture is configured to adjustably engage the first tower structure and the second tower structure, and
      a groove disposed on a perimeter of the aperture, wherein the groove is configured to engage at least one of the first plurality of ridges and at least one of the second plurality of ridges.

2. The device of claim 1 wherein the first tower structure and the second tower structure extend through the aperture.

3. The device of claim 1 wherein the second tower structure further comprises:
   a second tower structure second end disposed in a second vertical alignment with the second tower structure first end; and
   wherein the second tower structure first end is configured to be disposed toward the center of the aperture and in a second vertical misalignment with the second tower structure second end;
   wherein the second vertical misalignment of the second tower structure first end with the second tower structure second end disengages all of the at least one of the second plurality of ridges from the groove; and
   wherein the first vertical misalignment of the first tower structure first end with the first tower structure second end and the second vertical misalignment of the second tower structure first end with the second tower structure second end disengages the first member from the second member.

4. The device of claim 1 wherein the first member further comprises:

a first tower structure first ridge disposed on a first tower structure outer side;
a second tower structure first ridge disposed on the first tower structure outer side;
a first tower structure second ridge disposed on a second tower structure outer side in a first horizontal alignment with the first tower structure first ridge; and
a second tower structure second ridge disposed on the second tower structure outer side in a second horizontal alignment with the second tower structure first ridge; and
the second member further comprises:
a groove disposed on a perimeter of the aperture, wherein the groove is configured to simultaneously engage the first tower structure first ridge and the second tower structure first ridge or the first tower structure second ridge and the second tower structure second ridge.

5. The device of claim 1 further comprising:
a first indicia disposed on a first member base bottom side.

6. The device of claim 1 wherein the first member further comprises:
a first member first drawstring capture upright, having a first member first arcuate depression formed on a first member first drawstring capture upright upper side thereof, disposed on the first member base; and
the second member further comprises:
a second member first drawstring capture upright, having a second member first arcuate depression formed on a second member first drawstring capture upright upper side thereof, disposed on the second member base;
wherein the first member first arcuate depression opposes the second member first arcuate depression.

7. The device of claim 6 further comprising:
a first member first drawstring capture upright first rib disposed within the first member first arcuate depression along a first member first drawstring capture upright inner edge;
a first member first drawstring capture upright second rib disposed within the first member first arcuate depression along a first member first drawstring capture upright outer edge, parallel to the first member first drawstring capture upright first rib;
a second member first drawstring capture upright first rib disposed within the second member first arcuate depression along a second member first drawstring capture upright inner edge; and
a second member first drawstring capture upright second rib disposed within the second member first arcuate depression along a second member first drawstring capture upright outer edge, parallel to the second member first drawstring capture upright first rib.

8. The device of claim 6 wherein the first member further comprises:
a first member second drawstring capture upright, having a first member second arcuate depression formed on a first member second drawstring capture upright upper side thereof, disposed on the first member base parallel to the first member first drawstring capture upright; and
the second member further comprises:
a second member second drawstring capture upright having a second member second arcuate depression formed on a second member second drawstring capture upright upper side thereof, disposed on the second member base parallel to the second member first drawstring capture upright;
wherein the first member second arcuate depression opposes the second member second arcuate depression.

9. The device of claim 8 wherein the first tower structure is disposed on the first member base between the first member first drawstring capture upright and the first member second drawstring capture upright and the second tower structure is disposed on the first member base opposing the first tower structure and between the first member first drawstring capture upright and the first member second drawstring capture upright.

10. A device comprising:
a first member base;
a first tower structure secured to the first member base;
a first tower structure first ridge disposed on a first tower structure outer side;
a first tower structure first end;
a first tower structure second end disposed in a first vertical alignment with the first tower structure first end;
a second tower structure secured to the first member base opposing the first tower structure;
a second tower structure first ridge disposed on a second tower structure outer side in a first horizontal alignment with the first tower structure first ridge;
a second member base with an aperture disposed therethrough, wherein a first tower structure first end and a second tower structure first end extend through the aperture;
a groove disposed on a perimeter of the aperture, wherein the groove engages the first tower structure first ridge and the second tower structure first ridge;
wherein the first tower structure first end is configured to be disposed toward a center of the aperture and in a first vertical misalignment with the first tower structure second end; and
wherein the first vertical misalignment of the first tower structure first end with the first tower structure second end disengages the first tower structure first ridge from the groove.

11. The device of claim 10 further comprising:
a second tower structure first end; and
a second tower structure second end disposed in a second vertical alignment with the second tower structure first end;
wherein the second tower structure first end is configured to be disposed toward the center of the aperture and in a second vertical misalignment with the second tower structure second end; and
wherein the second vertical misalignment of the second tower structure first end with the second tower structure second end disengages the first tower structure second ridge from the groove.

12. The device of claim 10 further comprising:
a first tower structure second ridge disposed on the first tower structure outer side in a first vertical alignment with the first tower structure first ridge; and
a second tower structure second ridge disposed on the second tower structure outer side in a second vertical alignment with the second tower structure first ridge and in a horizontal alignment with the first tower structure second ridge.

13. The device of claim 10 further comprising:
a first member first drawstring capture upright, having a first member first arcuate depression formed on a first member first drawstring capture upright upper side thereof, disposed on the first member base; and
a second member first drawstring capture upright, having a second member first arcuate depression formed on a second member first drawstring capture upright upper side thereof, disposed on the second member base and opposing the first member first drawstring capture upright.

14. The device of claim 13 further comprising:
a first member second drawstring capture upright, having a first member second arcuate depression formed on a first member second drawstring capture upright upper side thereof, disposed on the first member base parallel to the first member first drawstring capture upright; and
a second member second drawstring capture upright, having a second member second arcuate depression formed on a second member second drawstring capture upright upper side thereof, disposed on the second member base parallel to the second member first drawstring capture upright and opposing the first member second drawstring capture upright.

15. The device of claim 14 wherein the first tower structure is disposed on the first member base between the first member first drawstring capture upright and the first member second drawstring capture upright and the second tower structure is disposed on the first member base opposing the first tower structure and between the first member first drawstring capture upright and the first member second drawstring capture upright.

16. A device comprising:
a first member further comprising:
  a first member base;
    a first tower structure secured to the first member base, wherein a first tower structure first end is disposed in a first vertical alignment with a first tower structure second end;
    a second tower structure secured to the first member base, wherein a second tower structure first end is disposed in a second vertical alignment with a second tower structure second end;
    a first tower structure first ridge disposed on a first tower structure outer side;
    a first tower structure second ridge disposed on the first tower structure outer side in a third vertical alignment with the first tower structure first ridge;
    a second tower structure first ridge disposed on a second tower structure outer side in a first horizontal alignment with the first tower structure first ridge;
    a second tower structure second ridge disposed on the second tower structure outer side in a fourth vertical alignment with the first tower structure first ridge and in a second horizontal alignment with the first tower structure first ridge;
    a first indicia disposed on a first member base bottom side;
    a first member first drawstring capture upright, having a first member first arcuate depression formed on a first member first drawstring capture upright upper side thereof, disposed on the first member base; and
    a first member second drawstring capture upright having a first member second arcuate depression formed on a first member second drawstring capture upright upper side thereof, disposed on the first member base parallel to the first member first drawstring capture upright;
wherein the first tower structure is disposed on the first member base between the first member first drawstring capture upright and the first member second drawstring capture upright and the second tower structure is disposed on the first member base opposing the first tower structure and between the first member first drawstring capture upright and the first member second drawstring capture upright; and a second member further comprising:
a second member base with an aperture disposed therethrough, wherein the first tower structure first and end the second tower structure first end extend through the aperture;
a groove disposed on a perimeter of the aperture, configured to simultaneously engage the first tower structure first ridge and the second tower structure first ridge or the first tower structure first ridge and the second tower structure second ridge when the first tower structure first end is disposed in the first vertical alignment with the first tower structure second end and the second tower structure first end is disposed in the second vertical alignment with the second tower structure second end;
a second member first drawstring capture upright having a second member first arcuate depression formed on a second member first drawstring capture upright upper side thereof disposed on the second member base, opposing the first member first drawstring capture upright; and
a second member second drawstring capture upright having a second member second arcuate depression formed on a fourth upper side thereof, disposed on the second member base parallel to the second member first drawstring capture upright and opposing the first member second drawstring capture upright;
wherein the first tower structure first end is configured to be disposed toward a center of the aperture and in a first vertical misalignment with the first tower structure second end;
wherein the first vertical misalignment of the first tower structure first end with the first tower structure second end disengages the first tower structure first ridge from the groove;
wherein the second tower structure first end is configured to be disposed toward the center of the aperture and in a second vertical misalignment with the second tower structure second end; and
wherein the second vertical misalignment of the second tower structure first end with the second tower structure second end disengages the first tower structure second ridge from the groove.

* * * * *